Dec. 2, 1952 W. BURROWS 2,619,887
GARDEN TRACTOR ATTACHMENT
Filed Sept. 3, 1947 2 SHEETS—SHEET 1

INVENTOR
WILFRID BURROWS
BY John P. Chandler
HIS ATTORNEY

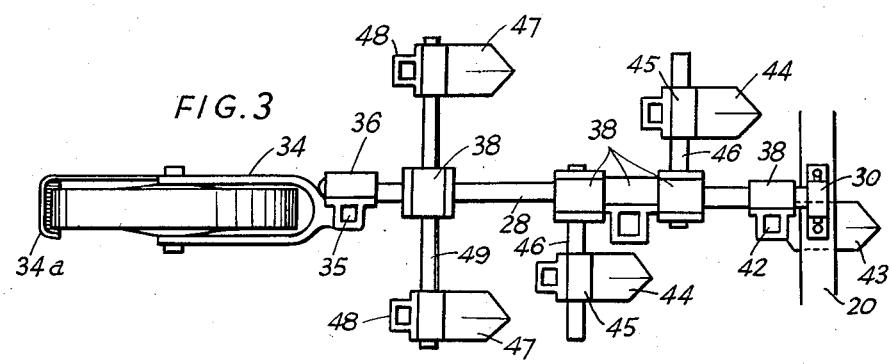
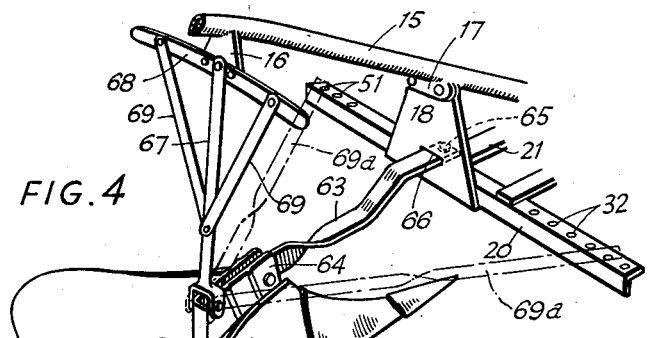
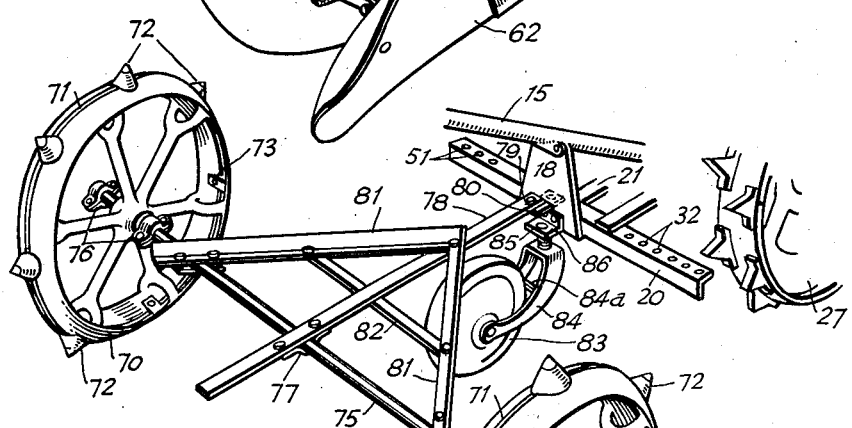

Patented Dec. 2, 1952

2,619,887

UNITED STATES PATENT OFFICE 2,619,887

GARDEN TRACTOR ATTACHMENT

Wilfrid Burrows, Whitley, near Warrington, England, assignor to W. Burrows (Manchester) Limited, Manchester, England Application September 3, 1947, Serial No. 771,939
In Great Britain September 10, 1946

5 Claims. (Cl. 97—48)

This invention relates to agricultural implements, and more particularly to means for attaching a plough, cultivator, or other tool to a motor tractor of the two-wheeled narrow-track type provided with steering handles, so that the assembly forms a single unit adapted to be guided by a person walking behind it.

The expression "narrow-track," as used above and hereinafter, is intended to denote a machine whose wheel spacing or track enables it to be employed in the treatment of row crops, the tractor when so employed straddling one or more ridges or rows with its wheels running in the furrows or clear of the growing plants.

When attaching tools to a tractor of the type aforesaid, it has been a common practice hitherto to mount the front end of a plough beam, or of a draw-frame or trailing gear to which toolbars are secured, upon a substantially vertical swivel pin disposed beneath the tractor at a position in front of the wheel axle.

In one well-known arrangement, the steering handles, which are rigidly connected to the tractor, are supported against the reaction of the driving torque by means of a stay connecting them to the plough beam or tool-bars aforesaid, such stay being capable of swinging laterally to accommodate itself to the swivelling movement of the trailing structure in relation to the tractor.

Hitherto, owing to the fact that the swivel pin to which the trailing structure is connected is disposed more or less on the longitudinal centre-line of the tractor, and that any lateral off-setting of the line of working from such centre-line can only be effected by suitably setting the stay, it has not been found possible satisfactorily to employ the arrangement above described in connection with the treatment of potato and similar row crops; i. e. for hauling the tools used for ridging or drilling, covering up and inter-row cultivation, for which operations the tools must necessarily be arranged substantially in the track of one of the driving wheels.

The chief object of one part of the present invention is to provide an improved means for attaching tools to a tractor of the type in question, which will enable the above-mentioned operations to be carried out effectively, whilst being equally applicable for a variety of other purposes.

According to this part of the invention I provide a draw-bar adapted to be rigidly secured to the tractor so as to extend transversely of the latter behind the driving wheels thereof, in combination with a tool-carrying beam whose front end is connectable to said draw-bar at any of a number of alternative positions along the length of the latter, and means for preventing both horizontal and vertical oscillatory movements of said beam in relation to said draw-bar.

The draw-bar aforesaid may form part of a frame which includes a central longitudinal member adapted for connection to an existing towing hitch, a laterally offset member for attachment to some suitable part of the main structure of the tractor, and a strut interposed between the draw-bar and the steering handles.

The positioning means for the tool-carrying beam may comprise mutually divergent stays connecting the rear end of the said beam to the draw-bar to a further transverse member which is rigidly attached, or adapted to be so attached, to the steering handles, said beam thereby becoming part of a triangulated structure.

A second part of the present invention has for its object the adaptation of a ridge-splitting or other plough to enable it to be worked on the centre-line of a tractor of the type aforesaid, when the latter is fitted with my improved tool-attachment means, it being understood that when the latter is already connected to a centre-line towing hitch on the tractor it is impossible to swivellably attach the front end of the plough beam directly to such hitch in the normal manner.

According to this second part of the present invention I provide the plough with a relatively short beam whose front end is adapted to be rigidly connected to the draw-bar portion of my improved tool-attachment means, the torque reaction being taken in known manner by means of a vertical stay rigidly attached to the plough beam, but lateral oscillation of such vertical stay being prevented by mutually divergent stays connecting its lower part to a transverse member fixed or adapted to be fixed to the steering handles.

I thus obtain a towed structure rigid with the tractor in both the horizontal and the vertical plane, so that it can be readily guided with the accuracy which is requisite for such operations as splitting the ridges prior to potato-dibbling, and which is difficult to achieve when, as has been usual hitherto, the plough beam and the upper end of the stay are free to swing in relation to the tractor.

A further part of the present invention is concerned with an improved form of dibbling machine for use in connection with my improved tool-attachment means.

According to this further part of the invention, the machine comprises an axle upon which a pair of land wheels with dibbling lugs are freely rotatable, and a triangulated frame rigidly secured to such axle with its front end adapted for swivellable connection to the draw-bar structure, preferably at a point on the centre line of the tractor.

In the accompanying drawings:

Fig. 3 is a plan view of the tool-carrying beam as arranged for inter-row cultivation.

Figs. 4 and 5 are views similar to Fig. 2, and illustrate, respectively, an adapted plough and an improved dibbling machine as associated with the draw-bar aforesaid for centre line working.

Figures 1, 2:
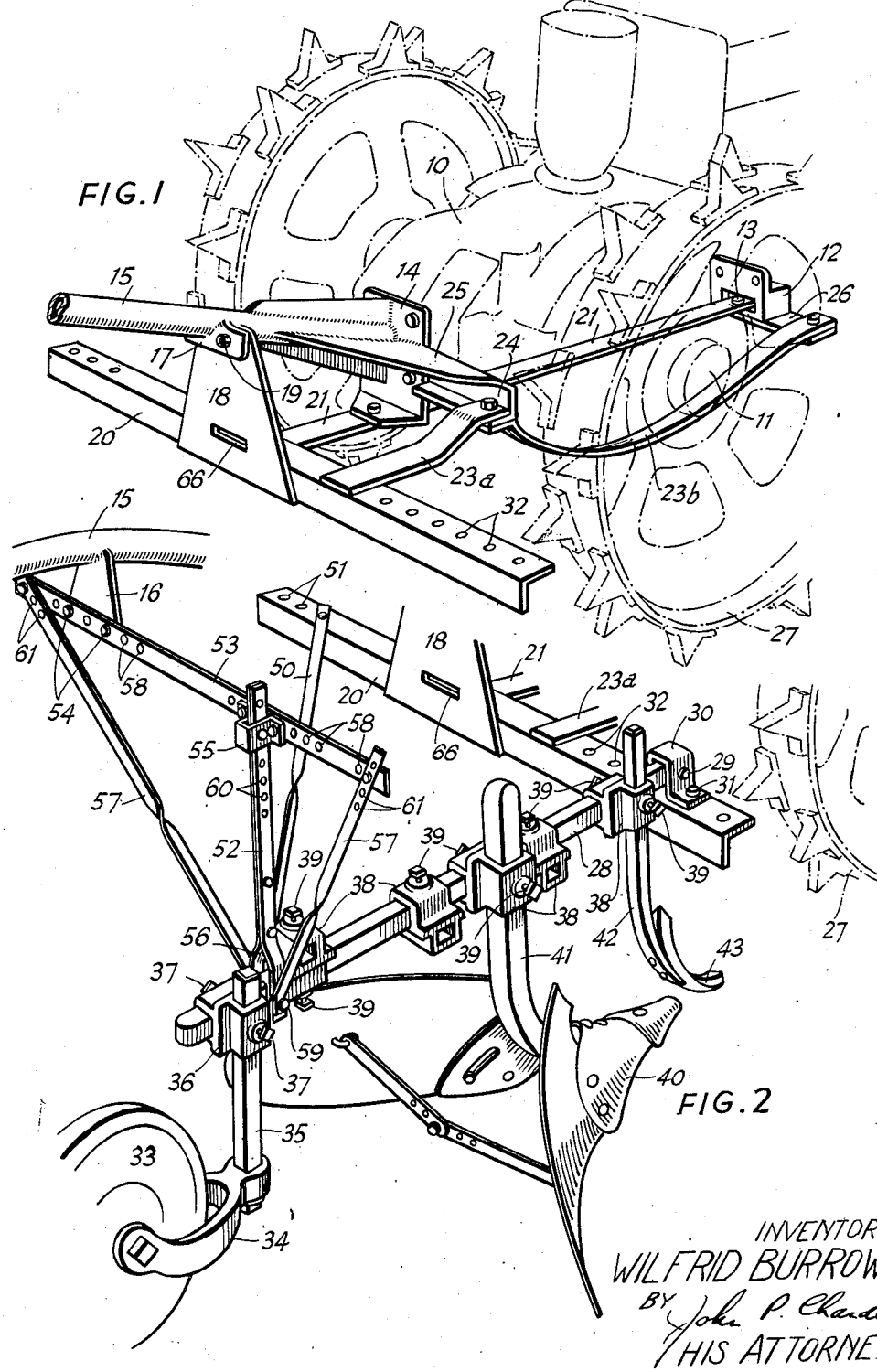
Fig. 1 is a perspective view of the draw-bar structure of my improved tool-attachment means and indicates the manner of its application to a known form of tractor.
Fig. 2 is a similar view showing the tool-carrying beam associated with the draw-bar for offset working.

In the construction illustrated in Figs. 1 and 2 the invention is applied to a two-wheeled tractor whose main structure comprises a transmission housing 10 upon which the driving engine is mounted, this housing 10 having secured thereto (below the level of, and somewhat in advance of, the wheel axle 11) a towing hitch 12 to which the front end of a plough beam, or of a rearwardly extending draw-frame, would normally be swivellably connected. Such a towing hitch will usually comprise a dependent bracket having a laterally elongated socket whose upper and lower walls are formed with several pairs of opposed holes providing alternative positions for the vertical swivel pin 13.

The known form of tractor under consideration has a facing on the rear part of the transmission housing 10 to which is rigidly bolted an attachment plate 14 at the front end of an upwardly inclined tubular column 15, the rear end of such column carrying laterally spaced steering handles at a convenient height. Adjacent the upper end of the column 15 is also provided a dependent lug 16 intended to transmit the torque reaction through the medium of an upright stay associated therewith.

In adapting such a tractor, a bracket 17 is fixed, permanently or otherwise, to the steering column 15 just behind its attachment to the transmission housing 10, and a dependent plate 18 is bolted to this in a substantially vertical plane parallel to the wheel axle 11. Preferably this plate 18 is secured by two laterally-spaced bolts 19 so that it cannot rock upon the bracket 17.

Welded at or near its centre to the lower edge of the plate 18 is a horizontal draw-bar 20 of angle-section metal, the upper flange of this draw-bar being directed forwardly and having welded to its central portion a stout metal strip or bar 21, which extends longitudinally of the tractor and is bolted at its free end to the towing hitch 12.

For additional rigidity, this longitudinal member 21 (which constitutes the shank of a T whose head is the draw-bar 20) may be bolted to a lug or flange 22, at the lower edge of the steering column attachment plate 14, or alternatively it may carry an upstanding slotted bracket adapted to be engaged over the attachment studs of the plate 14 and held in place by the nuts thereon.

Welded to the flange of the draw-bar 20 (at the off-side of the plate 18, as viewed from the rear of the tractor) is a second longitudinal member extending beneath the transmission housing 10 to a convenient attachment point at the front portion of the latter.

This second longitudinal member may be formed in two sections 23a, 23b, whose adjacent ends are connected to an intermediate anchorage, which may be associated with the slotted bracket above-mentioned, or may be constituted by a short lateral extension 24 of the steering column attachment plate 14, such extension preferably being also secured to a triangular gusset 25 bracing the column 15. The front attachment point aforesaid may be constituted by a lateral extension 26 of the towing hitch 12.

When ridging or drilling, covering potatoes and the like, or cultivating between the rows, the tools require to operate in or closely adjacent the track of the off-side tractor wheel 27, which will run in one of the furrows, and under these conditions of working the tool-carrying member of my improved attachment means is connected to the off-side arm of the draw-bar 20 at a suitable point thereon.

The tool-carrying member aforesaid comprises a metal beam 28, preferably of square section, whose front end is adapted for connection by means of a transverse bolt 29 to a U shaped bracket 30 on the draw-bar 20, this bracket being secured by means of bolts 31 passed through any two of a series of spaced holes 32 in the draw-bar, so that lateral adjustment of the beam 28 in relation to the latter may be effected.

The rear end of the beam 28 is supported upon a small wheel 33 which controls the depth of working of the tool and may, if desired, have a castor action, provision being made for adjusting such wheel vertically in relation to the beam to vary the depth of working.

For example, the wheel 33 may be mounted in a fork 34 provided with a scraper 34a and adapted to swivel upon the lower end of a post 35 which extends through a clamp 36, this latter conveniently taking the known form of a box with two mutually perpendicular sockets each provided with a binding screw 37. With this form of clamp, the end of the beam 28 is secured in one socket whilst the upstanding wheel-post 35 is adjustably fixed in the other.

Further clamps 38, which may be of similar construction to the clamp 36 just described and provided with binding screws 39, may be arranged at intervals along the beam 28, the free sockets of some of these being set vertically to receive tool-posts, whilst others may be set horizontally to receive cross-bars to whose ends tools are secured by similar clamps in offset positions.

When a "coverer," light shell, or ridging plough is used as at 40, the post 41 associated therewith may be mounted in one of the clamps 38 at or about the centre of the beam 28, with a single tool-post 42 and point 43 at the front end of the latter, whilst for inter-row cultivation it is preferred to leave the front point 43 and in position to substitute for the plough four offset points, two at each side of the beam. A convenient arrangement (shown in Fig. 3) is to mount the front offset tools 44 close to the beam in clamps 45 associated with separate cross-bars 46, the rear tools 47 having a greater offset and their clamps 48 being mounted at the ends of a common cross-bar 49. The tools in question may be suitable for either light or deep working, and their operative portions may be arranged to give a scuffling or hoeing effect.

To prevent any lateral oscillation of the beam 28 about its point of attachment to the draw-bar 20, a stay 50 is mounted diagonally between the rear end of the beam and the near-side arm of the draw-bar, such stay conveniently comprising a length of strip metal which is twisted through 90° intermediate its ends, so that one such end may be bolted to the side of the beam 28 whilst the other is similarly attached to the horizontal flange of the draw-bar 20, which flange is formed with a series of bolt-holes 51 to provide for lateral adjustment of the stay 50 bodily with the beam.

The "pitch" of the tools (i. e. the inclination of the beam 28 to the horizontal) is determined by a substantially vertical stay 52 interposed between the rear end of the beam and a transverse member 53 rigidly secured to the steering column 15.

This transverse member 53 may comprise a flat strip of metal secured horizontally, by two laterally spaced bolts 54 to the existing lug 16 near the top of the column 15, the vertical stay being connected to a bracket 55 or brackets on one arm of the transverse member and having its lower end forked at 56 to embrace the beam 28.

Further stays 57 are arranged diagonally between the forked end 56 of the vertical stay 52 and the two ends of the transverse member 53, the latter co-operating with the stays 52, 57 to form a triangulated structure which takes the reaction of the driving torque and also, in conjunction with the horizontal triangle formed by the beam 28, draw-bar 20 and diagonal stay 50, effectively positions the tool or tools in relation to the tractor.

A row or rows of bolt holes 58 is or are provided in the transverse member 53 to allow for lateral adjustment of the vertical stay bracket 55 or brackets along its length, and/or for lateral adjustment of the transverse member 53 relatively to the steering column lug 16, to suit the position at which the beam 28 is connected to the draw-bar 20.

Furthermore, the vertical and diagonal stays 52, 57, whose lower ends may be attached to the beam 28 by a common bolt 59, are formed with rows of alternative bolt holes 60, 61, respectively at their upper ends to enable the rear end of the beam 28 to be raised or lowered relatively to the steering column 15.

Although the invention has been described with reference to an arrangement in which the tools operate in or adjacent the track of the off-side tractor wheel 27, the parts are readily transposable to permit the tools to work behind the near-side wheel if preferred.

If it is desired to connect the beam 28 to the centre of the draw-bar 20 so that the tools operate in the known manner midway between the wheel-tracks, the transverse member 53 attached to the steering column may be dispensed with and the vertical stay 52 fixed rigidly to the steering column lug 16.

When it is desired to operate a plough on the centre-line of the tractor for ridge-splitting or similar purposes, the arrangement shown in Fig. 4 may be employed, the plough proper 62 being of any suitable type, preferably with the usual means for pitch adjustment (i. e. the raising or lowering of the point) and for varying the spread of the wings to suit the operation to be carried out.

The beam 63 of such plough comprises a short length of flat-section metal strip which is placed with its greater dimension horizontal, its rear end portion being twisted through 90 degrss and rigidly bolted to the plough body 64.

From the latter the beam 63 extends forwardly with, if desired, a slight upward crank and its front end is drilled to receive a bolt 65 whereby it is rigidly attached to the draw-bar 20 on the tractor.

The vertical plate 18 associated with such draw-bar is formed with a horizontal slot 66 of a size which will snugly accommodate the front end of the plough beam 63, the latter extending through the plate 18 and the bolt 65 being passed through the horizontal flange of the draw-bar.

Also connected to the plough body 64 is a vertical stay 67 whose upper end is attached to a transverse member 68 rigidly secured to the steering column lug 16 and corresponding to the member 53 of the preceding construction. Further stays are arranged diagonally between the lower part of the vertical stay 67 and the two arms of the transverse member 68 at 69, as well as (preferably) between the plough body 64 and the arms of the draw-bar 20, as at 69a.

In this way there is obtained a fully triangulated structure serving the same purpose as that illustrated in Fig. 2 and similarly co-operating with the draw-bar structure.

In the improved potato or like dibbling machine shown in Fig. 5, use is made of a known form of land wheel 70 having a V section rim which is slotted at 71 along the apex of the section to receive threaded stems associated with conical dibbling lugs 72 adapted to be fixed to the rim. The bases of these lugs 72 (whose number and angular spacing around the wheel periphery may be varied to suit the distance apart of the holes to be produced) are shaped to accommodate the apex of the rim section, the threaded stems aforesaid passing through the rim slot 71 and being provided with nuts which act upon wedge-shaped blocks 73 within the rim. The outer ends of the spokes 74 are forked to permit free angular adjustment of the lugs 72.

Two such wheels 70 are mounted for free rotation upon opposite ends of a plain tubular or other axle 75, each wheel being permitted a substantial amount of lateral float between collars 76 adjustably fixed upon the axle to enable the track of the wheels to accommodate itself to a variable spacing of the ridges, which (as will be understood) have previously been split by a plough such as that shown in Fig. 4.

The wheel track may be approximately twice the average pitch of the ridges, between which run the driving wheels 27 of the tractor, and in using the machine the tractor will be steered so that alternate ridges are treated during each of two consecutive traverses of the field.

The wheels 70 are of substantial weight, so that the V section rims form the drills to the desired shape whilst the projecting lugs 72 are producing the holes for the seed potatoes or their equivalent.

Secured centrally to the axle 75, preferably by means of a U shaped or other clamping plate 77, is a longitudinal frame member 78 of flat section whose front end is swivellably connected by a bolt 79 to the draw-bar 20 at a point on the centre-line of the tractor.

For this purpose the draw-bar 20, or the vertical plate 18 connecting it to the steering column 15, may be provided with a rearwardly projecting lug drilled to receive the swivel bolt 79.

When, as above mentioned, the vertical plate 18 is slotted to receive the end of a plough beam 63, this lug may be constituted by a short strip of metal 80 bolted to the horizontal flange of the draw-bar 20 and projecting rearwardly through the slot.

From a point about midway between the axle connection and its front end, the longitudinal frame member 78 is connected by mutually divergent stays 81 (preferably of angle-section) whose rear ends are clamped to the axle 75, this arrangement providing a rigidly triangulated structure.

If desired, the mid-points of the diagonal stays 81 may be connected by a transverse tie 82 which is also secured to the longitudinal member 78.

Owing to the arrangement of the draw-bar 20 and its swivel lug 80 immediately behind the tractor wheels 27, the dibbling machine can be arranged close behind the tractor so that the steering of the latter is in no way obstructed, the fact that the dibbler wheel track is substantially greater than that of the tractor permitting small-radius turns to be made at the headlands without risk of the dibbler fouling the tractor wheels.

It will be appreciated that the dibbling machine above described functions purely as a trailer attachment, for which reason it is desirable to provide behind the tractor axle a small supporting wheel 83 which takes the torque reaction and preferably has a castor action.

This supporting wheel 83 may be mounted in a fork 84 provided with a scraper 84a and comprising side members welded to a channel-section crown, which latter is connected by a springloaded pivot bolt 85 to an angle-bracket 86 on the draw-bar 20 or on the vertical plate 18 associated therewith.

If desired a rope or other flexible connection (not shown) may be provided between the longitudinal member 78 of the dibbler frame and the steering handles or column 15 of the tractor to prevent the latter from tilting forwards when not actually pulling.

Obviously the arrangements above described may be modified in various ways without departure from the spirit of the invention, and it will also be appreciated that when the tractor employed is designed, or can be adapted, to straddle two ridges or rows instead of only one, the tool assemblies shown in Figs. 2 and 3 can be operated on the centre-line of the machine.

What I claim is:

1. For application to a two-wheeled narrow-track motor tractor provided with steering handles, a tool-carrying beam adapted to be rigidly hitched to said tractor at any one of a number of laterally spaced alternative positions thereon, means for securing tools to said beam, said securing means being adjustable along the length of said beam, adjustable means for securing a wheeled supporting member to said beam, and means for connecting said beam to a steering column extending rearwardly from said tractor for preventing both horizontal and vertical oscillatory movement of said beam in relation to said bar.

2. For application to a two-wheeled narrow-track motor tractor provided with steering handles extending rearwardly therefrom, a tool-carrying beam adapted to be rigidly hitched to said tractor at any one of a number of laterally spaced alternative positions thereon, adjustable means for securing a wheeled supporting member to said beam, a plurality of adjustable clamps adapted to be positioned at any one of a number of positions on said beam for securing tools thereto, and means for connecting said beam to a column extending rearwardly from said tractor for preventing both horizontal and vertical movement of said beam in relation to said bar.

3. For application to a two-wheeled narrow-track motor tractor provided with steering handles extending rearwardly therefrom, a tool-carrying beam adapted to be rigidly hitched to said tractor at any one of a number of laterally spaced alternative positions thereon, adjustable means for securing a wheeled supporting member to said beam, a plurality of adjustable clamps adapted to be positioned at any one of a number of positions on said beam for securing tools thereto, means for connecting said beam to a column extending rearwardly from said tractor for preventing both horizontal and vertical movement of said beam in relation to said column, said connecting means comprising a plurality of adjustable rigid members.

4. For application to a two-wheeled narrow-track motor tractor provided with steering handles, a tool-carrying beam adapted to be rigidly hitched to said tractor at any one of a number of laterally spaced alternative positions thereon, means for securing tools to said beam, said securing means being adjustable along said beam, and adjustable means for securing a wheeled supporting member to said beam.

5. For application to a two-wheeled narrow-track motor tractor provided with steering handles and a column extending rearwardly therefrom, a tool-carrying beam having its front end rigidly connected to said tractor, a diagonal stay connecting the rear end of said beam to said tractor at a point remote from that at which said beam is connected to the latter, a transverse member rigidly mounted upon said steering column adjacent said steering handles, an upright stay connecting the rear end of said beam to said transverse member and laterally offset from said column, and further stays connecting the rear end of said beam to said transverse member and diverging from said upright stay at opposite sides thereof, the whole assembly forming a single unit adapted to be guided through the medium of said steering handles.

WILFRID BURROWS.

REFERENCES CITED

The following references are of record in the file of this patent:

UNITED STATES PATENTS

| Number | Name | Date |
|---|---|---|
| 1,185,753 | Allen | June 6, 1916 |
| 1,375,854 | Mader | April 26, 1921 |
| 2,392,903 | Currie | Jan. 15, 1946 |
| 2,446,584 | Green | Aug. 10, 1948 |

FOREIGN PATENTS

| Number | Country | Date |
|---|---|---|
| 351,629 | Great Britain | July 2, 1931 |